US006138815A

United States Patent [19]

Reiners et al.

[11] Patent Number: 6,138,815

[45] Date of Patent: Oct. 31, 2000

[54] CONVEYOR SYSTEM FOR LOAD-CARRYING CARTS

[76] Inventors: Herbert Reiners, Strasse 47A, D-58256 Ennepetal, Germany; David Pelczmann, 16 Colles Ave., Morristown, N.J. 07960

[21] Appl. No.: 09/309,687

[22] Filed: May 11, 1999

Related U.S. Application Data

[60] Provisional application No. 60/085,248, May 13, 1998.

[51] Int. Cl.[7] .................... B65G 19/02

[52] U.S. Cl. .................... 198/321; 198/721; 198/726; 198/867.14

[58] Field of Search .................... 198/321, 326, 198/721, 726, 867.14, 419.2; 186/64

[56] References Cited

U.S. PATENT DOCUMENTS

| | | | |
|---|---|---|---|
| 3,305,064 | 2/1967 | Mullis et al. | 198/321 |
| 3,318,432 | 5/1967 | Mullis et al. | 198/321 |
| 3,395,784 | 8/1968 | Kanarek | 198/726 |
| 3,446,315 | 5/1969 | Close | 186/64 |
| 3,655,013 | 4/1972 | Weller . | |
| 3,861,514 | 1/1975 | Ling | 198/321 |
| 4,235,327 | 11/1980 | Heusler et al. | 198/326 |
| 4,326,622 | 4/1982 | Ellzey | 198/326 |
| 4,681,207 | 7/1987 | Goto et al. | 198/321 |
| 5,996,767 | 12/1999 | Misawa | 198/326 |

FOREIGN PATENT DOCUMENTS

| | | | |
|---|---|---|---|
| 0 012 149 | 5/1983 | European Pat. Off. . | |
| 2456791 | 8/1976 | Germany | 198/321 |
| 2916818 | 11/1980 | Germany | 198/321 |

*Primary Examiner*—Dean J. Kramer
*Assistant Examiner*—Paul T. Chin
*Attorney, Agent, or Firm*—Schweitzer Cornman Gross & Bondell LLP

[57] ABSTRACT

A cart conveyor system for the transport of load-carrying carts, as frequently used in airports, supermarkets, etc. up and down inclined pathways. The cart is provided with front and back wheels with different spacing, and the conveyor has separate tracks for the front and back wheels, arranged to support the wheels in a manner that maintains the cart in a generally horizontal orientation as it moves up or down the conveyor path. The cart is engaged adjacent one end by laterally opposed conveyor elements, which advance the cart along the incline. At the other end of the cart, a retaining element extends downward and is engaged by a retaining track to prevent tipping of the cart as it is moved along the conveyor path.

24 Claims, 10 Drawing Sheets

CONVEYOR SYSTEM FOR LOAD-CARRYING CARTS

This application claims priority of provisional application Ser. No. 60/085,248, filed May 13, 1998.

BACKGROUND AND SUMMARY OF THE INVENTION

The present invention relates to conveyor systems for movement of load-carrying carts. The invention is particularly useful for the conveyance of load-carrying carts between vertically separated floors, but can also be usefully applied to the conveyance of such carts horizontally. The system is useful in a wide variety of applications, such as transit terminals, supermarkets, warehouses, etc., as well as for a variety of industrial applications. The present invention employs technology of the Weller U.S. Pat. No. 3,655,013, and of European Patent No. 0,012,149, but constitutes an improvement over such technology.

Currently, the principal means for moving load-carrying carts from one elevation to another have been elevators, inclined moving walks, conventional escalators, and also special cart conveyors of the type described in the before-mentioned Weller U.S. patent. All such prior systems have had certain disadvantages, which are obviated by the present invention.

Until the present invention, elevators have offered the safest method of moving loaded carts from floor to floor. But taking into consideration the elevator floor space occupied by a cart and its attendant, the elevator capacity required to handle a large volume of traffic is such that this technique is both unrealistic and unacceptable for most purposes.

Inclined moving walks are used in some cases for moving carts and their attendants from place to place. However, such moving walks are not very suitable for moving carts from one vertical level to another. For one thing, safety codes require the inclination of the moving walk to be very low, so that extensive space is required for a given amount of change in elevation. In addition, there can be significant safety considerations because of possible run-away carts, etc.

It has also been proposed to provide specially designed carts that can be moved onto conventional passenger-carrying escalators, which typically can convey passengers at an angle of 30–35°. This, however, is regarded as a particularly dangerous technique for conveying of loaded carts because of the possibility of load shifting on the carts, tilting or jamming of the carts or the like.

The cart conveyor system of the before-mentioned Weller U.S. Pat. No. 3,655,013 is designed to allow a cart to be carried up or down a substantial incline, while the cart is retained in a more or less horizontal orientation. These conveyors are intended to be operated in parallel with passenger escalators or alongside stairways, for example, allowing the loaded carts to be placed on the special cart conveyor at one level and then retrieved at the next level, the passenger or cart attendant having either walked or been conveyed to the second level. The Weller U.S. Pat. No. 3,655,013 represented a significant advance in cart conveyor systems, particularly in recognizing the desirability of employing laterally opposed conveyor bands for engagement of the cart on opposite lateral sides. Nevertheless, the overall design of the Weller conveyor system has certain limitations which render its performance less than optimum for many applications.

In accordance with the present invention, a novel and improved cart conveyor system is provided in which both the cart and the conveyor are specially designed and adapted for each other to provide for highly efficient, safe conveyance of the carts, either upward or downward between different floor levels, or even along the same floor level where appropriate. To particular advantage, the carts and the conveyor mechanisms of the new system are mutually designed such that load-carrying platforms of the carts can be located very low on the cart, and preferably at a level which is little if any above the level of the wheels of the cart. This has one important advantage of maintaining the center of gravity of the loaded cart as low as practicable. Additionally, many carts of the existing conventional design, such as luggage carts frequently found at airports and other passenger terminals, are constructed with load-carrying frames providing not only a low center of gravity but also permitting lateral projection or overhang of the load items. The system of the present invention readily accommodates the design of its carts to be compatible with the load-carrying configuration of carts of the type which are currently used and accepted for conventional use on a level surface. In addition, carts constructed in accordance with the invention may in a practical manner be provided with physical structure, in the form of baskets, platforms or other load-carrying framework that itself projects laterally beyond the wheels of the cart and over the tops of the laterally opposed conveyor bands without compromising the safety of the system. This is made possible in part because the mutual design of the carts and conveyor mechanisms allows the load-carrying elements of the cart to be kept as low as possible to the ground, and also provides for laterally projecting portions of the load, and/or the load-carrying elements, to be guided and supported over the top of the conveyor bands during the conveying operation.

In accordance with another aspect of the invention, the design of the carts and conveyors is such that the load-carrying platforms, at least portions of which are at a minimum elevation, at or near the level of the wheels of the cart, nevertheless provide for and accommodate lateral protrusion of the load from the load-carrying platform. To this end, the system of the invention, which includes laterally opposed conveyor bands, engageable with the carts on opposite sides, provides for the conveyor bands to be positioned at the lowest practicable level, typically and preferably within the height of the wheels. In addition, housings for the conveyor bands are also located as low as practicable in order to accommodate the projection of load items, such as duffel bags and the like, laterally outward from the carts and over the tops of the conveyor band housings.

Load-carrying carts pursuant to the present invention are especially designed and constructed for cooperation with a conveyor mechanism as generally described in the preceding paragraph. Such carts typically have a pair of widely spaced, non-swivelling wheels at one end, typically the back end, and ones or more swivel-mounted wheels at the opposite end. Where a single swivel wheel is employed, it typically is mounted along the center line of the cart. If a pair of swivel-mounted wheels is employed, they typically are spaced symmetrically with respect to the center line of the cart, spaced apart a distance less than the spacing of the fixed wheels. The conveyor system is provided with separate wheel tracks for the front and back wheels of the cart. In addition, as shown in the before-mentioned patents, where the conveyor is inclined, the guide tracks for the respective front and back wheels are offset horizontally such that, when the cart is ascending or descending the conveyor path, the cart is maintained or more less in a horizontal orientation, preferably tilted slightly upward at the front. In addition, in accordance with the present invention, means are provided at the front of the cart for engagement with a retaining track extending along the conveyor path, which locks the front of the cart against vertical movement with respect to the conveyor path such that the cart, which is being engaged at the back by opposed conveyor bands, is prevented from tipping. Where a single front wheel is employed, the retaining means may be integrated with the wheel mounting structure. Where a pair of front wheels is provided, it may be more expedient to employ a separate retaining element, positioned to engage a central retaining track, running the length of the conveyor path.

The principles of the invention are applicable to a wide variety of cart constructions and configurations, including carts with free running wheels, carts with automatic or manual brake systems.

For a more complete understanding of the above and other features and advantages of the invention, reference should be made to the following detailed description of preferred embodiments thereof and to the accompanying drawings.

DESCRIPTION OF PREFERRED EMBODIMENTS OF THE INVENTION

Figure 1:
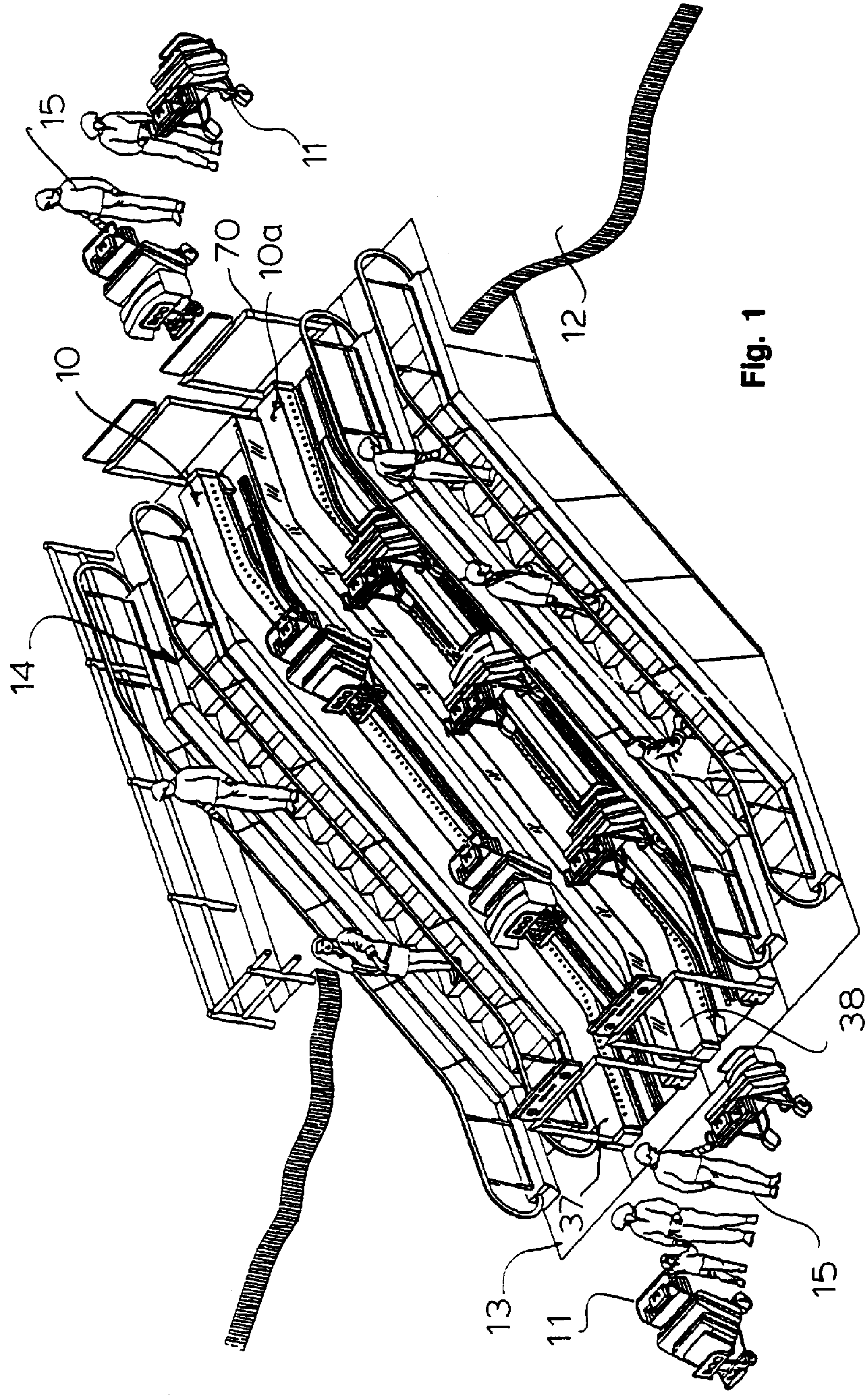
FIG. 1 is a perspective view illustrating a typical installation of up-going and down-going cart conveyor systems according to the invention, shown in association with a conventional passenger escalator.

Referring now to the drawings, and initially to FIG. 1 thereof, the reference numerals 10, 10*a* designates generally a conveyor system according to the invention for transporting luggage carts 11 between an upper level floor 12 and a lower level floor 13. In the illustrated installation, the cart conveyors 10, 10*a* are installed parallel and adjacent to conventional passenger escalators 14, 14*a*. This arrangement enables a user 15 to enter a cart 11 (either loaded or unloaded) into the entry end of the cart conveyor at one level, where it is picked up by conveyor bands and carried to the other level, as will be described. The user, after entering the cart into the conveyor system steps over to the passenger escalator 14, 14*a* and is carried thereby to the other level. Preferably, the relative speeds of the passenger escalators 14, 14*a* and the cart conveyors 10, 10*a* are such that the cart user will arrive at the second level at the same time or slightly in advance of the cart so as to be available to remove the cart as it arrives at its destination.

With reference to FIGS. 2, 3 and 5, and 7–10 of the drawings, the illustrated form of load-carrying cart 11 is provided with a pair of spaced-apart rear wheels 16, preferably mounted to be fixedly aligned, and a second pair of spaced-apart front wheels 17 mounted on swivels. The rear wheels 16 are set at the wider spacing and the front wheels 17, although spaced apart, are located closer to the center line of the cart, as is evident in FIGS. 8 and 9. The wheels are mounted on a frame structure which includes spaced-apart vertical frame elements 18, at the back of the cart, and a generally horizontal, somewhat U-shaped frame element 19. In the cart illustrated in FIGS. 7–10, the rear wheels are mounted within wheel shrouds 20, which are fixed to the lower ends 21 of the vertical frame elements 18. A plate 21, extending transversely across a front portion of the frame 19 provides a mounting for swivel brackets 21 by which the front wheel 17 are journaled for rotation and are arranged to swivel about a vertical axis in a generally well known manner.

Figure 2:
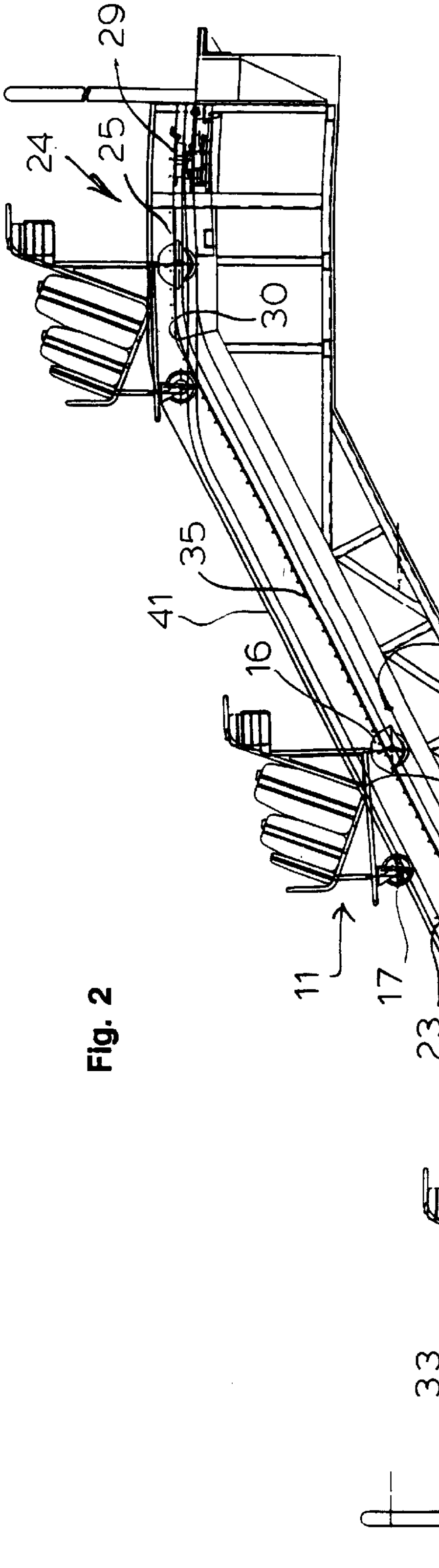
FIG. 2 is a side elevational view of the down-going cart conveyor system of FIG. 1, with parts removed to show details of construction.

The down-going conveyor installation shown in FIG. 2 is provided with two sets of wheel tracks, a first set of widely spaced tracks 22 for the fixed wheels 16, and a second set of tracks 23 for the swivel wheels. In the illustrated arrangement, the fixed wheels are located at the back and the swivel wheels in the front, and this is normally to be preferred, although this could be reversed under appropriate circumstances. In the down-going conveyor system of FIG. 2, the tracks 23 for the front wheels are offset horizontally in the forward direction relative to the tracks 22 for the rear wheels. As a result, while the cart is moving along the inclined conveyor path, the cart is retained in a more or less horizontal disposition, as is evident in FIG. 2. A slight downward tilting of the front end of the cart, while on the down-going conveyor, may be desirable from the standpoint of the overall geometry of the conveyor mechanism.

Figure 5:
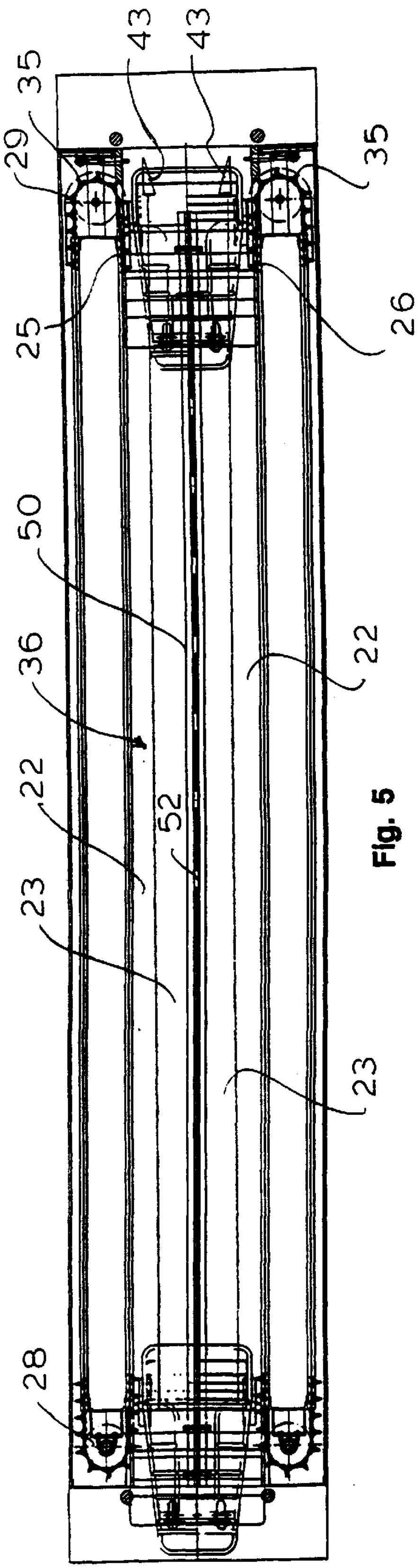
FIGS. 5 and 6 are top plan views of the cart conveyor system of FIGS. 2 and 4 respectively.

At the entry end 24 of the down-going conveyor mechanism, both of the tracks 22, 23 are at the same level, and desirably may tilt downward slightly so that gravity assists the movement of the cart into engagement with moving conveyor bands 25, 26 (FIG. 5). The respective tracks 22, 23 then go through a transition area, shown in FIG. 2, in which the tracks change course from the slight downward incline to a relatively steeper downward incline. Typically, the principal inclined path of the conveyor mechanism is disposed at about 30° to the horizontal.

In the conveyor system of the before-mentioned Weller U.S. Pat. No. 3,655,013, a conveyor mechanism is provided which includes opposed conveyor bands for engaging the cart on opposite lateral sides and advancing the cart along the desired path. This broad principle is employed in the system of the present invention, with important improvements being provided in the design of both the conveyor mechanism itself and in the associated load-carrying carts, to provide for highly efficient, safe, two-way transport of the carts from one floor level to another. The conveyor bands 25, 26 utilized in the system of the invention are designed for two-way flexibility. That is, the bands are comprised of chain links which are hinged in one way for passing around drive and idler sprockets 28, 29 in the usual manner, with additional flexibility for redirection of the chain path in a vertical plane. As reflected in FIG. 2, the conveyor bands 25, 26 after passing around idler sprockets 29 at the upper end, travel in a slightly downwardly inclined path corresponding to the entrance path for the conveyor. Thereafter, the conveyor bands turn downward as at 30, to follow the principal downward incline of the conveyor, generally following the contour of the tracks 22 for the back wheels of the cart. Suitable guide tracks 27 (FIG. 22) are provided for the conveyor bands to cause them to follow the paths indicated. When the conveyor bands reach the bottom of the primary incline, they are redirected as at 31 to follow the slightly downwardly inclined exit path 32 of the cart, with the conveyor band in the exit portion 33 and at the turn 31 being guided to follow generally the contours of the guide track 22 for the back wheels 16. In the illustrated arrangement, the lower sprocket 28 is driven by a motor 34, although either end of the conveyor belts may be driven, as will be understood.

In accordance with principles known from the before-mentioned patents, the conveyor bands are formed with a series of closely spaced resilient projections or cones 35, preferably formed of rubber or plastic, which project laterally, in directly opposed relation, into a principal guide channel 36 (FIG. 5) provided by the structure of the conveyor installation, for the overall confinement and guidance of the carts, as they traverse the length of the conveyor mechanism. The conveyor bands are contained within housings 37, 38 which include side walls 39, 40 and top walls 41, 42. The side walls 39, 40, which may be formed of or covered with plastic material, are spaced apart a distance such as to closely confine the widely spaced back wheels 16 of the cart and enable them to be engaged and advanced by the projecting elements 35 of the conveyor bands, as will be further described.

When entering the conveyor mechanism, the front wheels of the cart are initially engaged by tapered guide blocks 43 (FIG. 5), which divert the front end of the cart as needed to align it properly with the principal longitudinal axis of the conveyor system.

One of the important improvements incorporated into the new system is an improved arrangement for engaging the carts by the projecting conveyor elements 35 at a very low level on the carts, preferably directly adjacent the back wheels and within the vertical confines thereof. To this end, the carts are advantageously provided with specially configured abutment brackets 44, fixed to the wheel shrouds 20. The brackets 44 extend laterally outward a short distance from the outer walls of the wheel shrouds 20 and preferably are of a V-shaped or arcuate configuration to provide upper and lower portions 45, 46 disposed at an angle of about 120°, typically each portion being disposed at an angle of about 30° forward of vertical for use in conjunction with a conveyor of approximately 30° incline.

Figure 4:
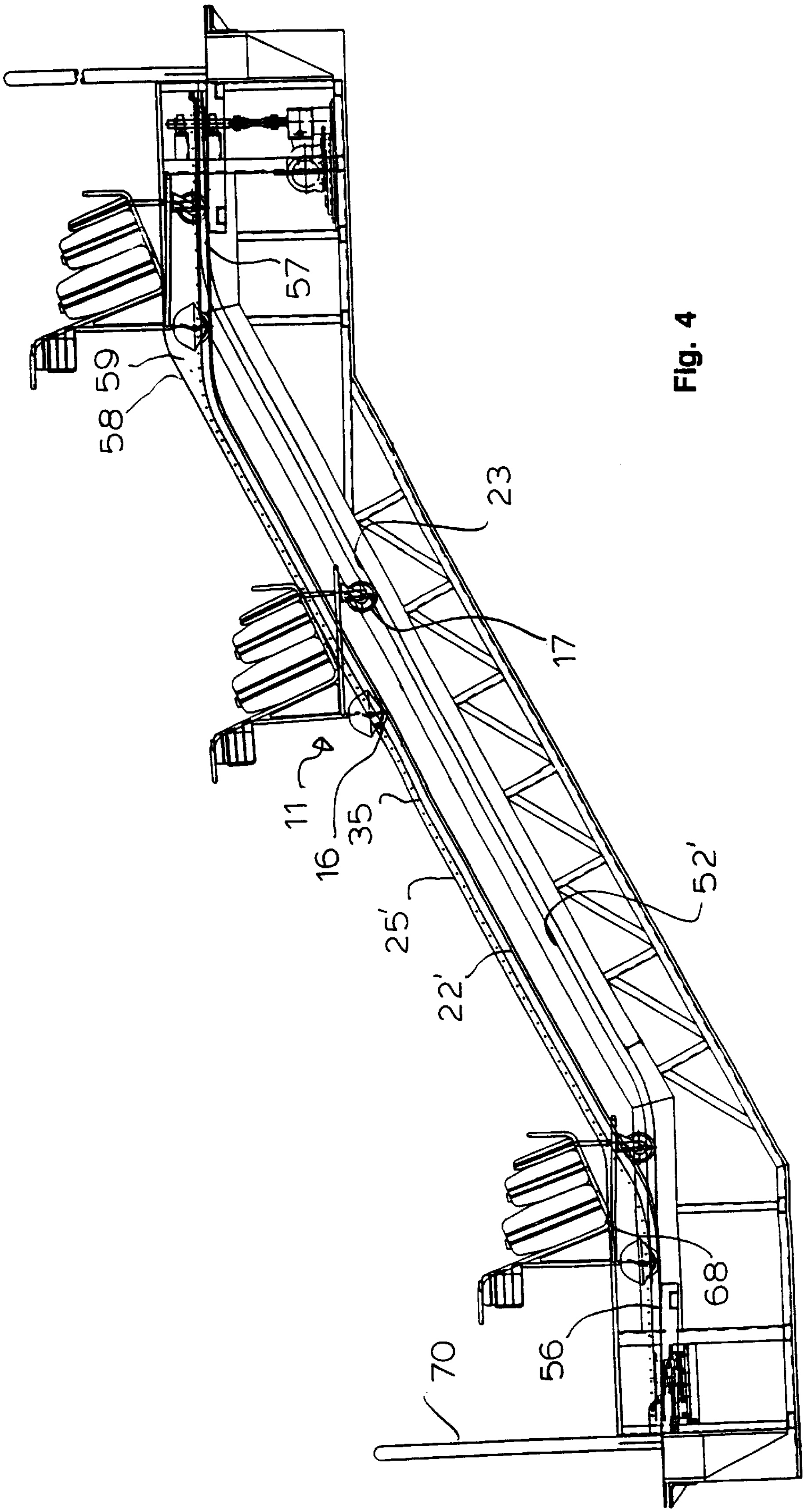
FIG. 4 is a side elevational view, similar to FIG. 2, illustrating an up-going cart conveyor system according to the invention.

The positioning of the conveyor bands 25, 26 is such that, when a cart 11 is descending a down-going conveyor, as shown in FIG. 2, the projecting elements 35 engage the upper portions 45 of the abutment brackets 44, so that the engaged surfaces 45 are disposed approximately at right angles to the axis of movement of the conveyor bands. Likewise, as shown in FIG. 4, when a cart 11 is ascending an up-going conveyor, the positioning of the conveyor bands 25', 26' is such that the projecting elements 35 thereof engage the abutment brackets 44 on the lower portions 46 thereof, so that the lower abutment bracket portions 46 are again disposed approximately at right angles to the axis of movement of the conveyor bands. Accordingly, when there is a maximum load relationship between the carts and the conveyor bands, as the carts are either ascending or descending the principal incline of the conveyor, there is an optimum mechanical relationship between the abutment brackets 44 and the conveyor projections 35. When the carts are on the landing areas, at the entrance or exit to the conveyors, the abutment brackets necessarily will be disposed at somewhat of an angle to the axis of movement of the conveyor bands in the landing areas. However, in these areas the motion of the carts is approximately horizontal and preferably slightly downwardly inclined, such that there is minimum force exerted between the conveyor bands and the carts and a less than optimum angle of contact with the abutment brackets is tolerable.

As will be appreciated, when a cart is descending the down-going conveyor, it is being urged by gravity down the incline. Accordingly, the function of the conveyor bands 25, 26 on the down-going side of the conveyor may be principally to control the speed of descent by engagement of the projecting elements 35 with front faces of the upper portions 45 of the abutment brackets. However, should the cart require any urging in the forward direction, the back faces of the abutment bracket portions 45 will be engaged by the following pair of projecting elements on the conveyor bands.

Figure 22:
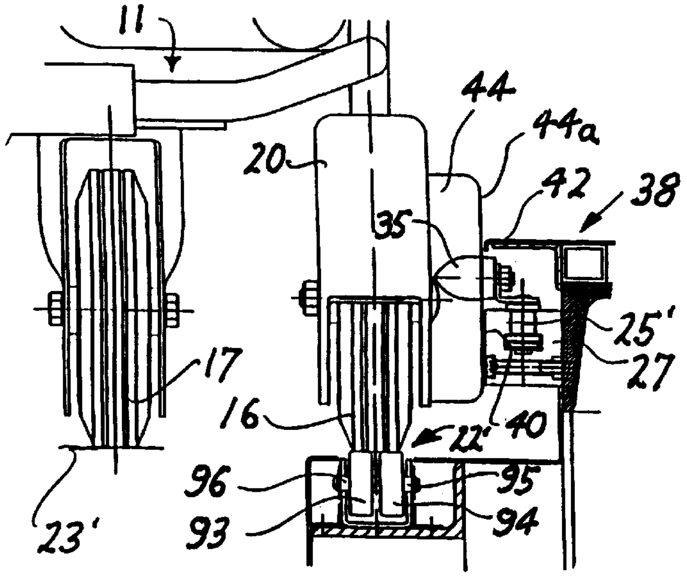
FIG. 22 is an enlarged, fragmentary illustration of the portion of FIG. 21, illustrating details of the roller track arrangement, as well as details of the cart moving and guiding arrangements.

To particular advantage, and as shown particularly in FIG. 22, the lateral projection of the abutment brackets 44 from the wheel shrouds 20 is such that, when the cart 11 is engaged by the respective conveyor bands, the outer edges **44*a* of the abutment brackets oppose the side walls 40** of the conveyor housing with only a slight clearance. This assures that the back wheels of the cart are accurately guided and confined as the cart proceeds along the conveyor path.

Pursuant to a significant aspect of the invention, means are provided for positively preventing the front of the cart from lifting as it is being propelled along the conveyor path. For this purpose, a retaining track 50 is provided running lengthwise along the conveyor path from one landing arena to the other. The retaining track 50 has overhanging flanges 51 at the top (see FIG. 8) defining a restricted, upwardly opening slot 52. A retaining element 53 is rigidly secured to the cart frame 19, preferably on the center line of the cart, directly between the swivelled front wheels 17. The retaining element extends downward and carries a cross bar or the like 54 at its lower extremity, which projects laterally outward from the lower end of the retaining element.

As the cart 11 approaches the entrance to the down-going conveyor, and the front wheels of the cart are engaged by the guide blocks 43. The front of the cart is thus centered with respect to the retaining track 50, enabling the retaining element 53 to enter the slot 52. Once the retaining element is received in the slot 52, it is prevented from lifting vertically out of the slot, by reason of the inwardly projecting flanges 51, which overlie the cross bar 54. This new feature is very important to the safety and efficiency of operation of the system because it prevents the front end of the cart from tilting upwardly at any time, which otherwise might cause the cart to overturn, possibly discharging and damaging its contents with potential damage to the cart itself and possibly the conveyor and the attendant delays and inconveniences. While center tracks have been used heretofore for lateral guidance of the front of the cart, the important function of retaining the cart against upward tilting of the front end is new and contributes importantly to the safety and effectiveness of the system.

Figure 6:
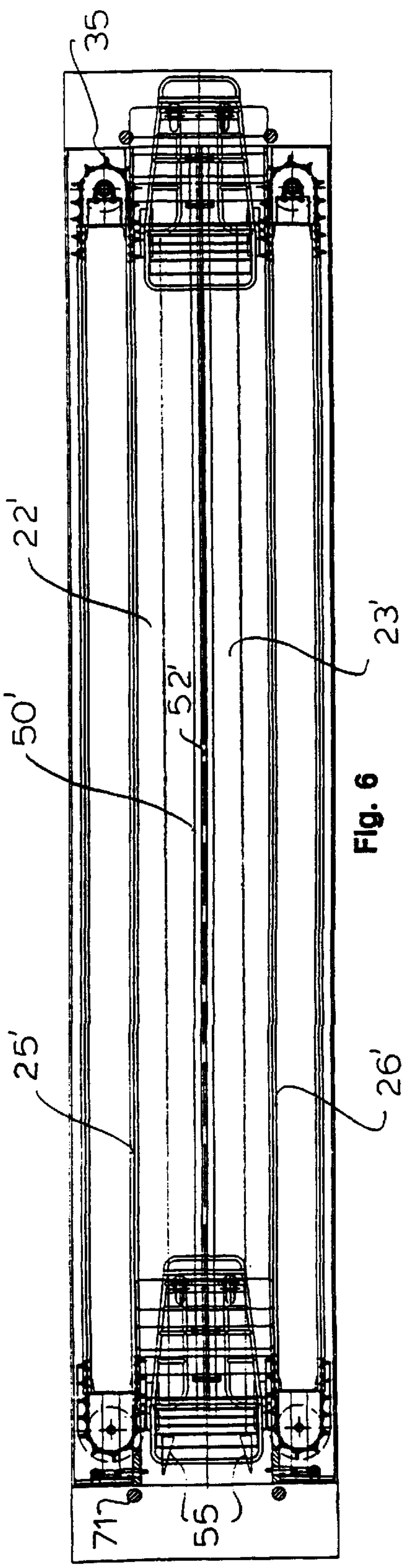
Figure 8:
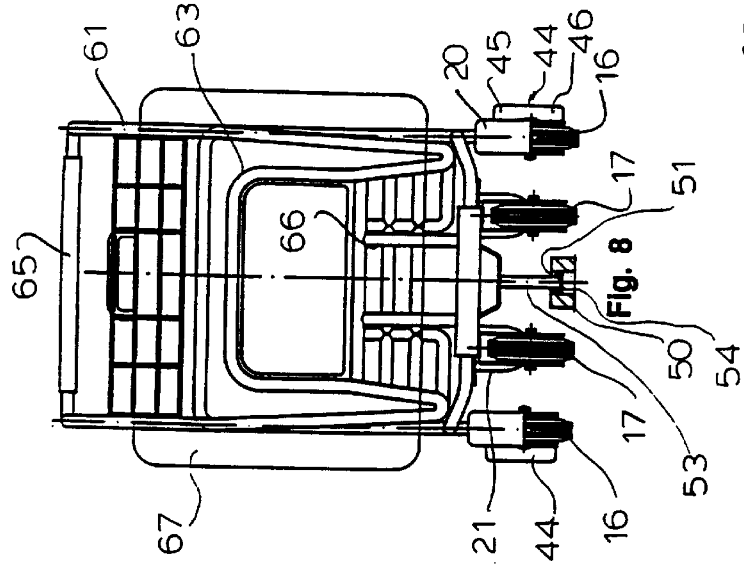
FIG. 8 is a front elevational view of the cart of FIG. 7.
Figure 10:
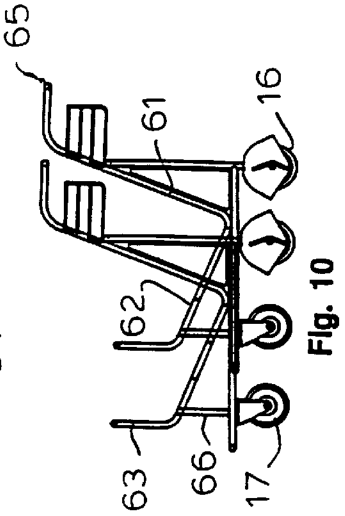
FIG. 10 is a side elevational view illustrating a plurality of the carts of FIG. 7 telescoped for storage.
Figure 7:
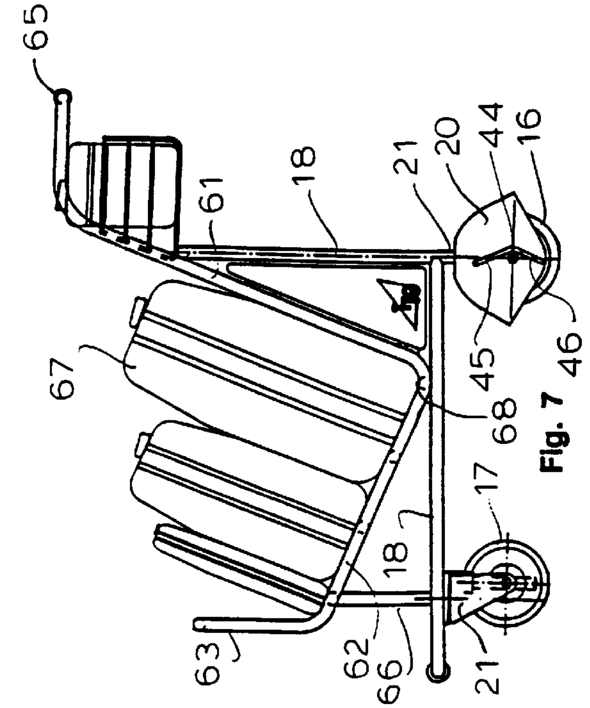
FIG. 7 is a side elevational view of one preferred form of load-carrying cart forming part of the conveyor system of the invention.
Figure 9:
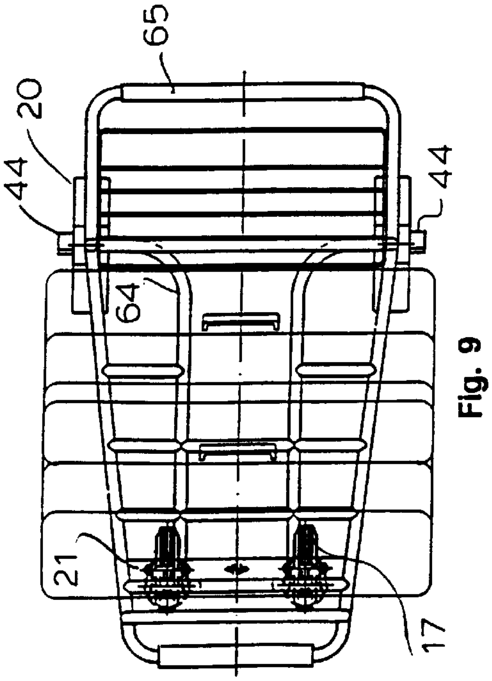
FIG. 9 is a top plan view of the cart of FIG. 7.
Figure 12:
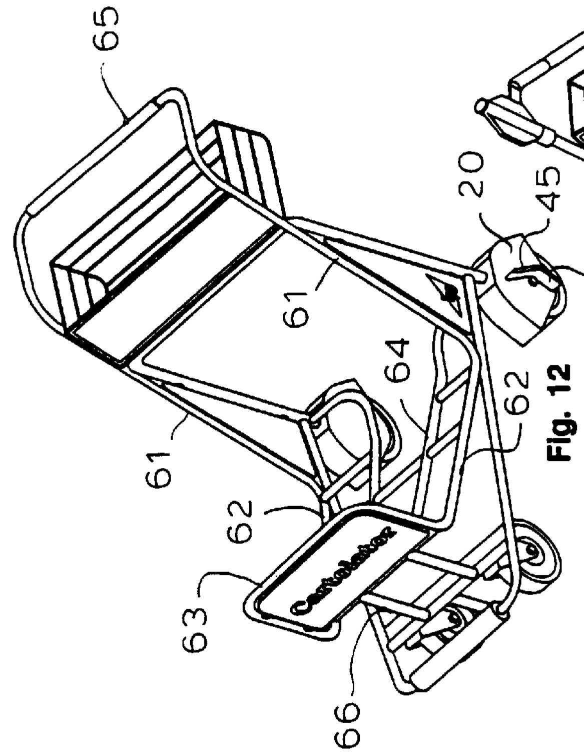
FIGS. 12, 13 are front perspective views of the cart of FIG. 7, illustrated empty and loaded with luggage items.
Figure 14:
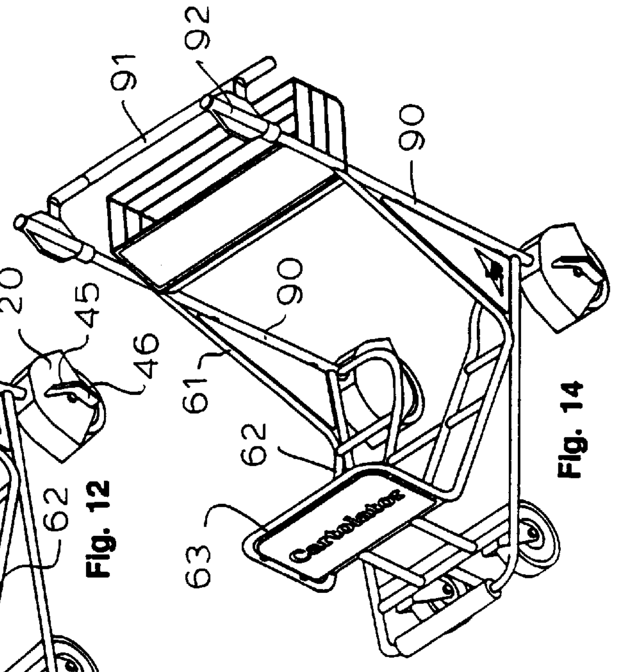
FIG. 14 is a front perspective view of the cart of FIG. 11.

In the system of the invention, the operation of the down-going and up-going conveyors is fundamentally similar. The up-going conveyor, shown in FIGS. 4 and 6, is provided with guide tracks 22' for the back wheels 16 of the cart and 23' for the front wheels 17. The front wheel tracks 23', as in the case of the down-going conveyor, are offset horizontally forward sufficiently that the cart 11 is supported in a substantially horizontal orientation, although a very slight upward tilt may be desirable from the standpoint of overall conveyor geometry. Tapered guide blocks 55 are provided at the lower landing area to guide the front wheels of the cart to a center position and guide the retaining element 53 of the cart into the slotted retaining strip 50' of the conveyor.

For the up-going conveyor, the vertical spacing between the conveyor bands 26' relative to the wheel tracks 22' is somewhat less than in the down-going conveyor of FIG. 2, such that the projecting elements 35 of the conveyor bands engage the lower portions 46 of the abutment brackets, as is desired.

At the respective landing areas 56, 57, the supporting platforms for the carts preferably are inclined slightly downward in the direction of cart movement, so that there is a slight assist from gravity in injecting the carts into the conveyor at the lower platform and in removing the carts from the system when they reach the upper landing platform.

Figure 3:
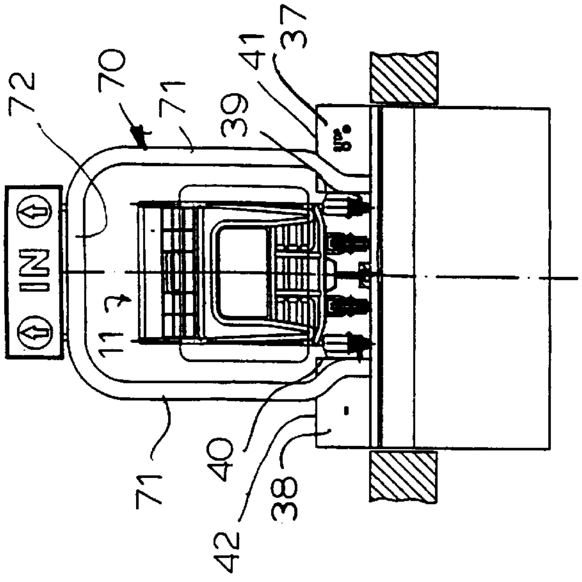
FIG. 3 is a front elevational view of the entry end of the cart conveyor of FIG. 2.

In accordance with the present invention, the up-going conveyor also includes an advantageous conveyor housing arrangement in which the upper conveyor housing walls 58 extend laterally outward from housing side walls 59 in the same manner as the walls 41, 42 extend outwardly from the side walls 39, 40 in the down-going conveyor shown in FIG. 3. The housing top walls 58 extend laterally outward at the lowest practicable level and, in the illustration of FIG. 4, this is approximately at the level of the axis of the back wheels 16 over the inclined portion of the conveyor.

FIGS. 7–10, 12 and 13 illustrate an advantageous form go of load-carrying configuration for the carts 11. In particular, the illustrated carts incorporate a back-tilted load platform, preferably of somewhat J-shaped configuration. The main frame of the load platform can be formed of a continuous length of rigid tubular material forming tilted back elements 61, bottom elements 62 and a generally vertically oriented front section 63 of inverted U-shaped configuration. Typically and desirably, the bottom of the load platform includes additional bottom frame elements indicated generally at 64 to assist in the load support. The back of the load platform, defined by the upwardly extending tubular element 61, preferably is open to allow a plurality of carts to be stacked in a telescoped manner, as reflected in FIG. 11. In the first illustrated form of the cart, upper ends of the back-forming tubular section 61 are joined at upper ends by a tubular section 65, forming a push handle for the cart. The front of the load platform is supported by uprights 66. As is evident in the drawings, the load platform is open at both sides, accommodating load items 67 of much greater width of the cart and load platform.

In a particularly preferred and advantageous form of load-carrying cart according to the invention, the bottom 62 of the load platform is disposed at an angle such, and is so positioned relative to the wheels of the cart that, when the cart is on an up-going conveyor (FIG. 4), the bottom 62 of the platform is substantially parallel to and substantially at the level of the top surface 58 of the conveyor housing. Accordingly, any luggage items 67 projecting laterally from the cart and its load platform, will extend out over the top surface 58 of the conveyor housings. In the case of duffel bags or soft luggage, for example, where projecting portions of load items may tend to sag, the smooth upper surface 58 of the conveyor housings will serve to support and stabilize the load. In the regions of the upper and lower landing areas 56, 57, the level of the top surface 58 of the conveyor housings is at or slightly under the level of the lowest point 68 of the load platform, so as to provide clearance for the load in the landing areas.

For the down-going conveyor, shown in FIG. 2, the level of the top surfaces 41, 42 of the conveyor housings is, in all positions of the cart, whether in the landing areas or on the incline, at or slightly below the lowest portion 68 of the load platform, to provide for overhang of the load.

It will be understood that the illustrated configuration of cart and conveyor, which allows for the lateral overhang and support of load items, can also accommodate lateral projection from the main frame of the cart of a rigid load-carrying platform, basket or the like.

Notwithstanding that the top surfaces of the conveyor housings provide support for laterally projecting load items, there is a desired limit to the extent to which load items should protrude from the physical confines of the cart proper. To this end, a load limiting frame 70 (FIG. 3) is provided at the entrance to the conveyor. The entrance frame 70 preferably is a rigid, free standing structure having vertical side elements 71 to establish the maximum width and maximum projection of any load item carried on the cart 11. A bar 72 extending across the top of the frame establishes a vertical limit for any load permitted to enter the conveyor.

Provision is customarily made to prevent the entry into the area of the conveyor mechanism of either persons or carts not specially designed for the conveyor. The variety of control devices and techniques is available for this purpose, which does not form part of the present invention. Among other things, however, the tapered guide blocks 43, for the down-going conveyor, and 55, for the up-going conveyor, in conjunction with the side walls of the conveyor housings, would prevent entry of most carts not intended for the conveyor system, unless fortuitously the wheel spacing and configuration were nearly identical.

The conveyor system of the invention contemplates the use of load-carrying carts having a single swivelled front wheel, as well as having multiple front wheels. An advantageous form of cart having a single front wheel is shown in FIGS. 15–19. The cart shown therein is essentially the same as the cart shown in FIGS. 7–10, 12 and 13, except for the front wheel configuration. Whereas the previously described cart has a pair of spaced-apart front wheels, mounted on swivels, and a centrally positioned, downwardly extending retaining element, the cart of FIGS. 15–19 has a single front wheel 80 centrally mounted at the front of the cart by a swivel bracket 81. Pursuant to one aspect of the invention, the swivel bracket 81 includes laterally outwardly projecting retaining elements 82 positioned adjacent lower extremities of the swivel bracket. These retaining elements 82 can be of any suitable form, such as rod-like projections, laterally projecting flanges extending from the lower portions of the swivel bracket, etc.

A retaining track 83 (FIG. 18) extends lengthwise along the conveyor, centrally between the side walls of the conveyor housing, in the same manner as the retaining tracks 52, 52' shown in FIGS. 5 and 6. The retaining track 83 comprises spaced-apart guide elements 84 provided with retaining flanges 85 along their upper edges defining an guide slot 86. The width of the guide slot 86 is such as to closely accommodate the swivel bracket 81 oriented in a straight-ahead position. The laterally projecting retaining elements 82 are positioned to lie just below the overhanging flanges 85 such that, once the wheel assembly 81, 82 enters the retaining structure 83, the front wheel is locked therein against upward movement by the flanges 85 and retaining elements 82. This prevents any flipping of the cart 11 as it traverses the conveyor. Desirably, the entrance and exit ends of the retaining structure are such that the swivel bracket 81 is engaged by the retaining structure substantially at all times while the cart is engaged to be advanced by the conveyor bands.

Figure 11:
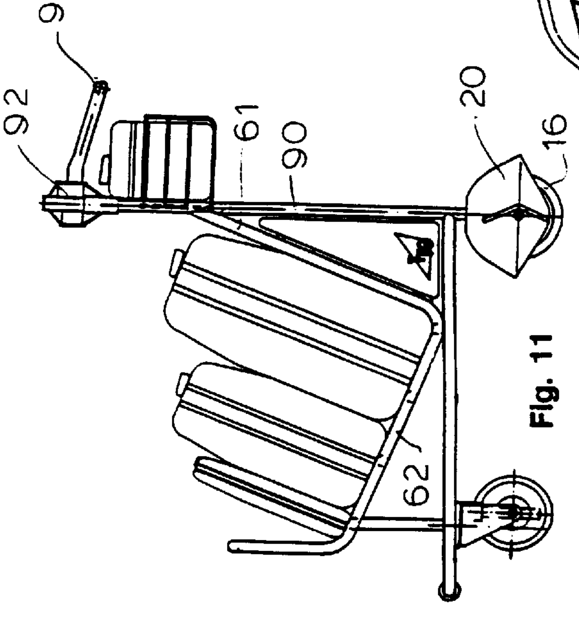
FIG. 11 is a side elevational view of a second preferred form of cart, similar to the cart of FIG. 7, but provided with brake means for locking wheels of the cart.
Figure 13:
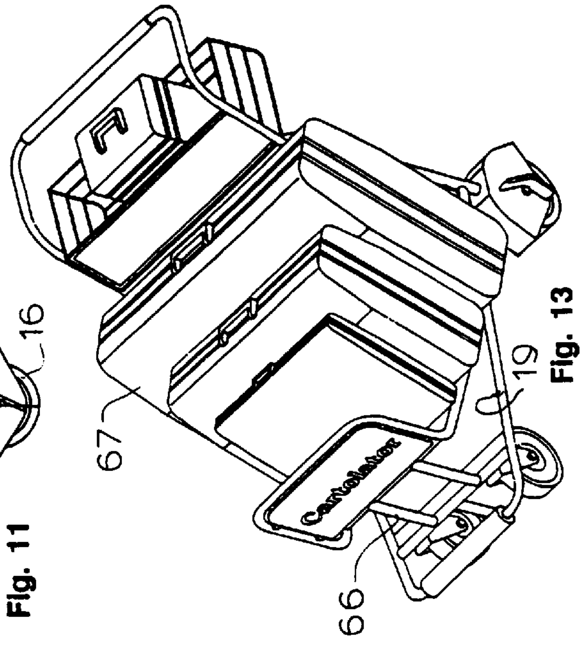
Figure 16:
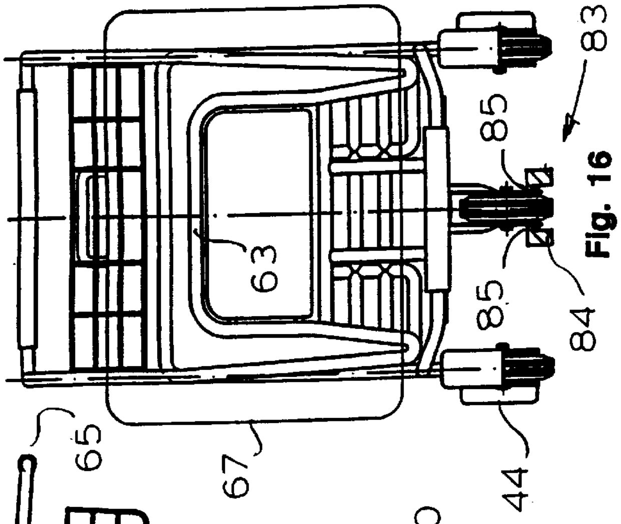
FIGS. 15, 16 and 17 are side elevation, front elevation and top plan views respectively of a third preferred form of load-carrying cart, similar to the cart of FIG. 7 but provided with a single front wheel.
Figure 15:
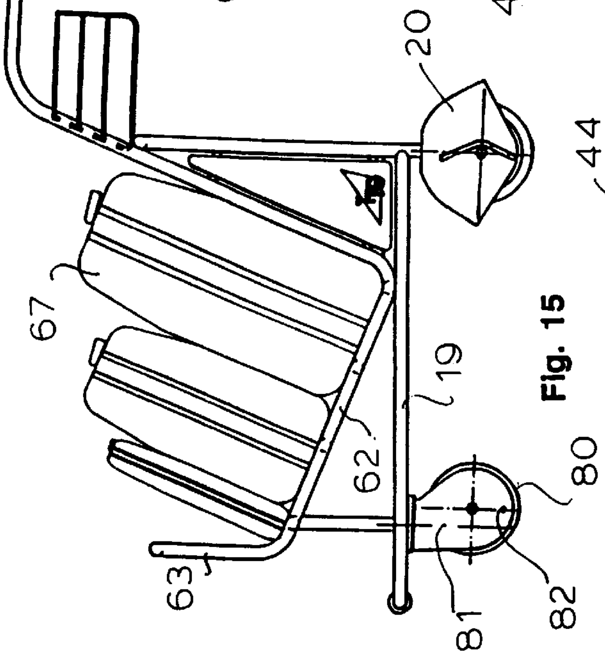
Figure 17:
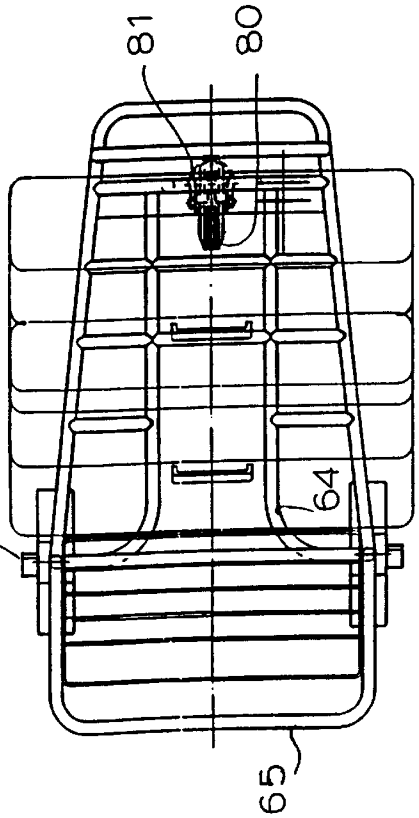
Figure 18:
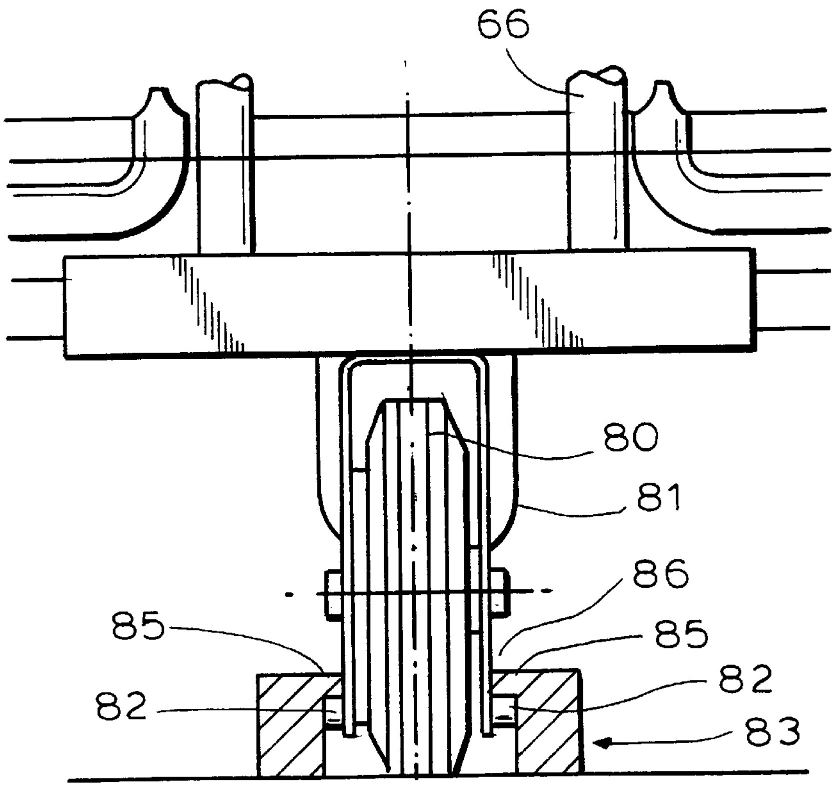
FIG. 18 is an enlarged, fragmentary view illustrating the front wheel mounting structure of the cart of FIG. 15.
Figure 20:
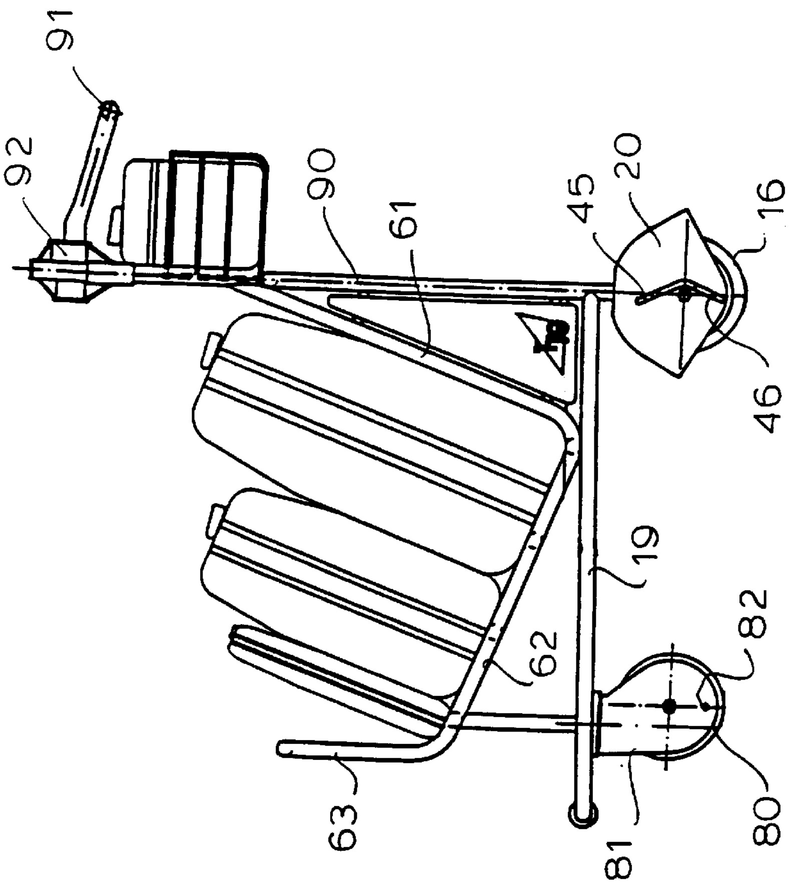
FIG. 20 is a side elevational view of a cart, similar to that of FIG. 15, but provided with brake means for locking wheels thereof.
Figure 19:
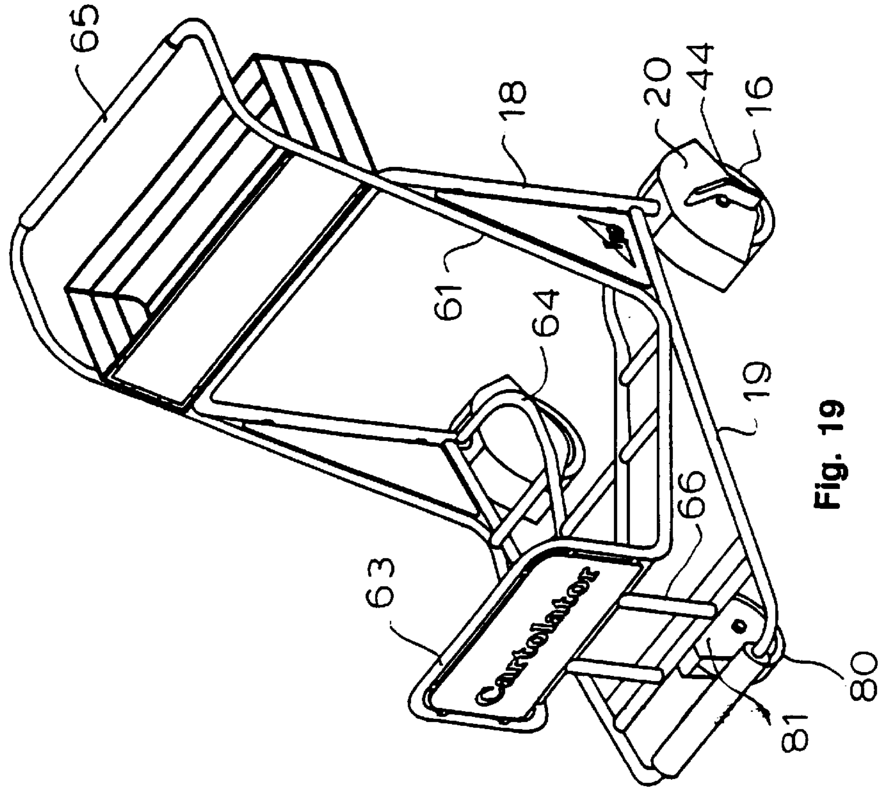
FIG. 19 is a front perspective view of the cart of FIG. 15.

The conveyor system of the invention is designed to accommodate load-carrying carts with either freely rotating wheels or braked back wheels (or both). FIGS. 11 and 20 illustrate typical forms of carts configured according to the invention, which are provided with means for locking the rear wheels 16. The two carts of FIGS. 11 and 20 are essentially the same, except that the cart of 11 is provided with two swivelling front wheels and a central retaining element, while the cart of FIG. 20 has a single swivelling front wheel with retaining elements combined with the front wheel swivel bracket. In both cases, the rear wheels 16 are mounted at the ends of vertical tubular elements 90 at each side. Push handles 91 are pivotally mounted to the vertical elements 90 at 92. By mechanisms not shown and forming no part of the present invention, the push handles are connected at the pivot housings 92 to braking elements associated with the wheel 16. When the handles are released, the wheels are automatically braked. When the handles are pressed by a user, the wheel brakes are released. The arrangement is such that the wheels are automatically locked when the carts are unattended.

Figure 23:
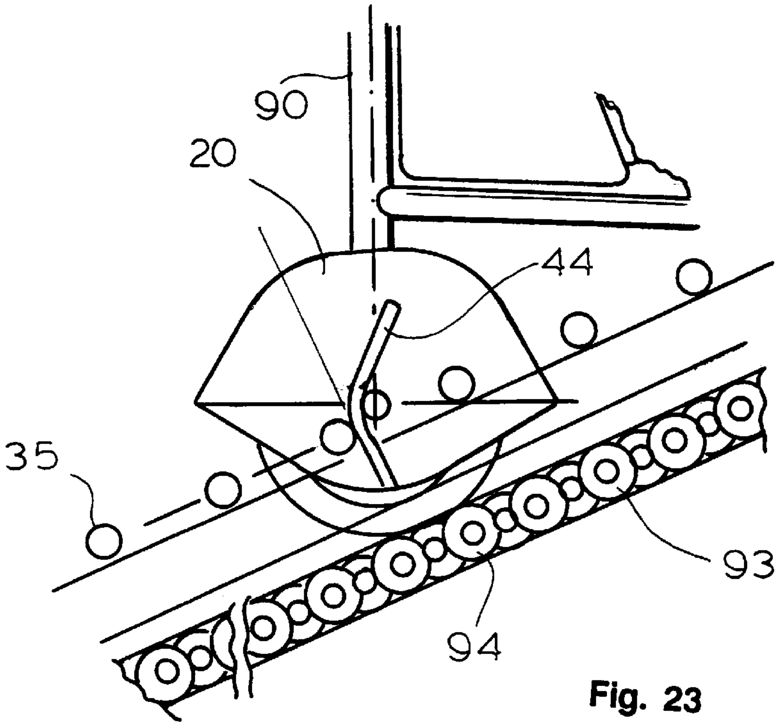
FIG. 23 is an enlarged, fragmentary view, partly in section, illustrating features of the roller track shown in FIGS. 21 and 22.
Figure 21:
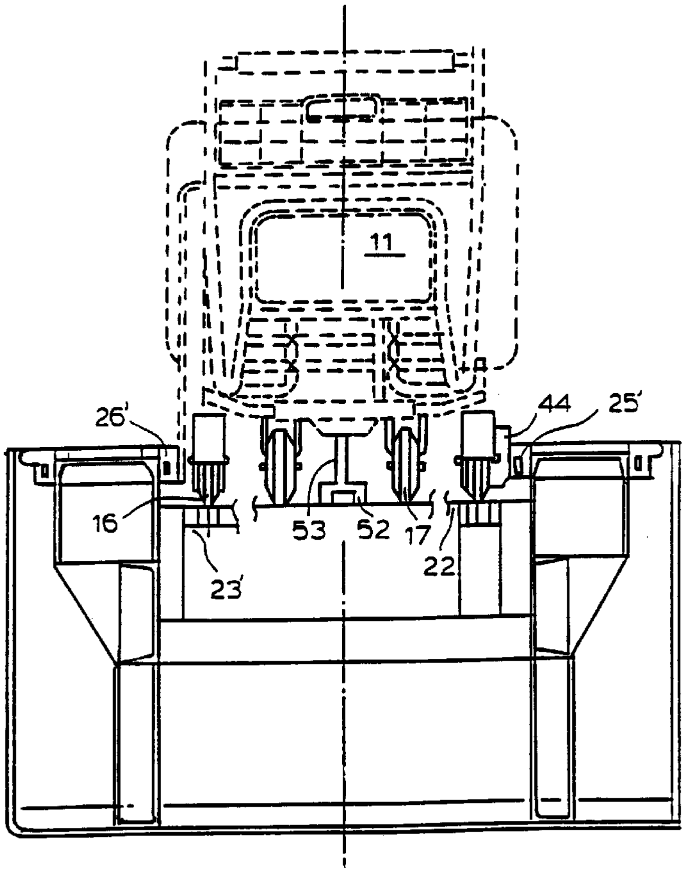
FIG. 21 is a cross sectional illustration of a modified form of cart conveyor system for handling carts having wheels which lock, either automatically or under the control of the user, the conveyor having a track made up of a series of closely spaced, freely rotating rollers supporting the locked wheels of the cart.

To accommodate carts with locked wheels, a modified form of the new conveyor system is provided, as shown in FIGS. 21–23. In the modified system, the guide tracks 22' for the back wheels of the cart are formed by a continuous series of rollers 93, 94 arranged side-by-side over the full length of the guide track. Thus, when the braked wheels are placed on the guide track, the cart can be moved along by the conveyor bands, because the locked wheels simply rotate the individual rollers which constitute the guide track.

As shown particularly in FIGS. 22 and 23, the freely rotating rollers 93, 94 are arranged in two side-by-side rows, with the rollers 93 constituting one row extending along one side of the guide track 22', and the rollers 94 similarly extending in an adjacent, along the opposite side of the guide track 22'. Additionally, the wheels 94 are offset from the wheels 93, so that the axles 95 of a wheel 94 lies between an adjacent set of wheels 93, and the axles 96 of the wheels 93 lie between adjacent wheels 94. The sets of wheels 93, 94 are separated longitudinally a minimal distance, sufficient only to accommodate the presence of the axles 95, 96, as shown best in FIG. 23. The arrangement is such that the respective sets of wheels 93, 94, in combination, form a reasonably level surface, as the locked cart wheels 16 transfer from one set of wheels to the other in advancing along the conveyor path. As is reflected in FIGS. 22 and 23, the diameter of the wheels 16 is a substantial multiple of the diameter of the support wheels 93, 94 (for example, five-six to one) such that the small "valleys" between longitudinally adjacent sets of wheels 93–94 has minimal effect upon the desired forward movement of the carts, and readily permits the carts to advance along the conveyor path in the manner desired.

As will be understood, when the guide track 22 for the rear wheels is formed of rollers 93, 94, the conveyor can handle carts with conventional, free rotating wheels and carts with braked wheels, interchangeably.

The conveyor system of the present invention provides a unique melding of conveyor and cart features to provide a highly efficient, completely safe system for the conveyance of loaded (and unloaded) carts from one floor level to another. The design features of the present invention enable the configuration of the cart to have an extremely low center of gravity when loaded. At the same time, the system allows for the loading of the cart in a manner to accommodate overhanging, laterally projecting load items and, where appropriate, enabling the load-carrying structure, platform or basket, to extend beyond the normal limits of the cart and to overhang the top of the conveyor housing.

Of particular significance is the provision of means at the front of the cart for engagement with a longitudinally extending retaining structure to prevent any tilting of the cart as it is being advanced by engagement with rear portions of the cart. By positively restraining the front of the cart against possible tilting, it becomes feasible to shorten the wheel base of the cart somewhat which in turn permits the offset between the guide tracks for the front and back wheels to be reduced. This in turn allows the load-bearing platform of the cart to be lowered, while allowing for laterally overhanging loads. Additionally, by providing for a few degrees of downward tilt of the front of the cart on the down-going conveyor and a few degrees of upward tilt on the up-going conveyor, further reduction in the offset between the tracks 22, 23 is enabled. This in turn allows further reduction in the level of the load platform on the cart. The combination of features of the invention provides for a system of greatly superior utility, efficiency and safety as compared to known systems for this general purpose.

In a particularly advantageous form of the cart, the back and bottom of the load platform are back tilted, to have somewhat of a J-shaped configuration. Two advantages are derived from this arrangement in conjunction with the conveyor system of the invention. One of the significant advantages, shown in FIG. 4, is that the bottom of the load platform can lie in a plane generally parallel to and substantially at the level of the upper surface of the conveyor housing. This allows load items to project laterally outward from all areas of the load platform, extending closely above the top of the conveyor housing, which can provide support and stability for the load.

For the down-going conveyor, the back tilting of the load platform results in the lowest portion 68 of the load platform being displaced well forward of the rear wheels 16. The forward offset of this low point enables it to be feasibly positioned at or slightly above the top surfaces 41, 42 of the conveyor housing. In the case of the down-going conveyor, since the track for the front wheel 17 is offset forwardly from the track for the rear wheels, the height of the front wheel track 23 and the associated retaining structure 52 is a limiting dimension, and any load item on a down-going cart must clear over the top of the retaining structure 52 which in effect then defines the approximate level of the top surfaces 41, 42 for the conveyor housings in the inclined portion of the conveyor.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. In a cart conveyor system of the type comprising an inclined conveyor mechanism including laterally spaced, opposed endless conveyor bands, and wheeled load carrying carts engageable by said conveyor bands and movable thereby from one end to another of said inclined conveyor mechanism, said cart having a frame with a predetermined centerline and having front and back ends, said cart being provided with spaced apart first wheels at one end and wheel means at the other end comprising one or more second wheels positioned closer to said centerline than said first wheels, and said conveyor mechanism having track means for the respective sets of first and second wheels at opposite ends of said cart whereby said cart is maintained in a substantially horizontal orientation while engaged by said conveyor mechanism, the improvement characterized by (a) said conveyor bands being engageable with said cart closely adjacent said first wheels for controlling the advance of said cart along said conveyor mechanism, (b) a retaining track extending lengthwise along said inclined conveyor mechanism, and (c) an anti-lift element extending between said cart and said retaining track adjacent the other end of said cart for retaining vertical spacing between said retaining track and said other end of said cart while said cart is being advanced along said conveyor mechanism.

2. A cart conveyor system according to claim 1, wherein said conveyor mechanism is inclined for transport of said cart from one level to a second level.

3. A cart conveyor system according to claim 2, wherein (a) said spaced apart first wheels are positioned at the back of said cart and said one or more second wheels are positioned at the front of said cart, (b) said first wheels are spaced apart farther than said one or more second wheels, (c) spaced apart abutment brackets are mounted on said cart immediately laterally adjacent to and laterally outside of said first wheels, (d) said conveyor bands are engageable with said abutment brackets, and (d) said anti-lift element extends between a front portion of said cart and said retaining track.

4. A cart conveyor system according to claim 3, wherein (a) said one or more second wheels comprises a pair of front wheels spaced apart a distance less than said first wheels, (b) said retaining track is located generally centrally between said front wheels, and (c) said anti-lift element extends downward from said frame, between said front wheels, to engage said retaining track.

5. A cart conveyor system according to claim 3, wherein (a) said one or more second wheels comprises a single front wheel centrally located between opposite sides of said cart, (b) a wheel mounting bracket extends from said cart for mounting said wheel, (c) said track means for said one or more second wheels includes a retaining track for receiving and vertically confining said single front wheel, (d) said anti-lift element comprises means projecting laterally from said wheel mounting bracket for cooperation with said retaining track to prevent vertical separation of said front wheel from said retaining track.

6. A cart conveyor system according to claim 3, wherein (a) said inclined conveyor mechanism is upwardly moving, (b) the track means for said second wheels are offset forwardly and downwardly with respect to the track means for said first wheels, and (c) said conveyor bands are engageable with said cart laterally adjacent said first wheels and at a level not substantially higher than said first wheels.

7. A cart conveyor system according to claim 3, wherein (a) said inclined conveyor mechanism is downwardly moving, (b) the guide track means for said second wheels are offset forwardly and upwardly with respect to the guide track means for said first wheels, and (c) said conveyor bands are engageable with said cart laterally adjacent said first wheels and at a level not substantially higher than said first wheels.

8. A cart conveyor system according to claim 3, wherein (a) said cart is provided with abutment elements laterally adjacent to outer sides of said first wheels, (b) said abutment elements being of generally horizontally oriented V-shaped configuration defining upper and lower abutment portions engageable by said conveyor bands, (c) said upper and lower abutment portions being oriented to be generally at right angles to the conveyor bands of upwardly and downwardly inclined conveyor mechanisms.

9. A cart conveyor system according to claim 2, wherein (a) said cart frame includes an open sided load-carrying section of generally J-shaped configuration having an upwardly and rearwardly inclined back section, an upwardly and forwardly inclined bottom section joined with said back section and disposed generally at right angles thereto, and a front section joined with said bottom section and extending upwardly therefrom, (b) the region of joining of said bottom and back sections comprising the lowest point of said load-carrying section relative to the wheels of said cart, (c) said conveyor having containment housings for said conveyor bands at each side substantially enclosing said conveyor bands, (d) said containment housings including inner side walls positioned laterally adjacent the spaced apart first wheels of said cart and providing lateral confinement thereof, and (e) said containment housings further including laterally outwardly extending upper walls positioned at or slightly below the level of said lowest point and providing a generally smooth, generally flat surface for the guidance and support of load items carried in said load-carrying frame and extending laterally outwardly therefrom.

10. A cart conveyor system according to claim 9, wherein (a) said conveyor mechanism is upwardly inclined at a predetermined angle, and (b) the bottom section of said load-carrying frame is disposed at an angle corresponding generally to the angle of upward incline of said conveyor mechanism.

11. A cart conveyor system according to claim 9, wherein (a) said conveyor mechanism has an entry end and an exit end, (b) a load limit frame is mounted directly in front of said entry end, and (c) said load limit frame comprises a pair of spaced-apart, upwardly extending side elements spaced apart a distance substantially greater than the maximum lateral spacing between wheels of said cart and defining an opening for the widest permissible load for a cart to be carried on said conveyor system.

12. A cart conveyor system according to claim 11, wherein (a) said load limit frame is positioned a sufficient distance in front of said conveyor mechanism that an overwide load is engaged by said frame before said cart is engaged by said conveyor bands.

13. A cart conveyor system according to claim 2, wherein (a) said conveyor bands are provided with a plurality of closely spaced, laterally extending engagement lugs for engagement with said cart on opposite sides thereof to control advancement of said cart along said conveyor system, (b) said cart is provided on opposite sides with abutment elements positioned to be contacted by said engagement lugs whereby movement of said cart is controlled by movement of said conveyor bands, and (c) said abutment elements are formed with a first section aligned generally at right angles to an angle of incline of an upwardly moving conveyor and a second section aligned generally at right angles to an angle of incline of a downwardly moving conveyor.

14. A cart conveyor system according to claim 13, wherein (a) said abutment elements are of a generally horizontally oriented V-shaped configuration, and (b) the first and second sections of said abutment elements are first and second portions of said V-shaped elements.

15. A cart conveyor system according to claim 13, wherein (a) said spaced apart first wheels of said cart are mounted thereto in a fixed orientation, (b) fixed wheel support elements mount said spaced apart wheels to said cart, and (c) said abutment elements are fixedly mounted on said wheel support elements.

16. In a cart conveyor system of the type comprising an conveyor mechanism inclined at an angle and including laterally spaced, opposed endless conveyor bands, and a wheeled load carrying cart engageable by said conveyor bands on opposite sides and movable thereby from one end to another of said inclined conveyor mechanism, said cart having a frame and having front and back ends and being provided with spaced apart first wheels at one end and one or more second wheels at the other end, and said conveyor mechanism having separate longitudinally extending, offset track means for the respective first and second wheels whereby said cart is maintained in a substantially horizontal orientation while engaged by said conveyor mechanism, the improvement characterized by (a) said conveyor bands being engageable with said cart adjacent the first wheels thereof and at a level not substantially higher than said first wheels for controlling the advance of said cart along said conveyor mechanism, (b) said cart having a load-carrying frame including bottom-forming frame elements inclined substantially at said angle when said first and second wheels are substantially horizontal, (c) said load-carrying frame including front and back frame portions for confining load items and defining a low point of said load-carrying frame at a level not substantially above said wheels, and (d) a containment housing covering at least top portions of said conveyor bands and extending laterally at a level not higher than said low point to accommodate and support load items projecting laterally from said load-carrying frame.

17. A cart conveyor system according to claim 16, wherein (a) said conveyor mechanism includes a retaining track extending longitudinally between said conveyor bands (b) retaining means interconnecting a front portion of said cart with said retaining track to prevent lifting of the front end of said cart while said cart is being advanced forwardly along said conveyor mechanism.

18. A cart conveyor system according to claim 17, wherein (a) said second wheels comprise a pair of wheels spaced apart a distance less than said first wheels, (b) said retaining means comprise a connecting element extending from a front portion of said cart into engagement said retaining track, (c) said retaining track having flange means overlying portions of said connecting element.

19. A cart conveyor system according to claim 16, wherein (a) the bottom elements of said load-carrying frame are inclined upwardly and forwardly substantially at the angle of inclination of an upwardly inclined conveyor mechanism.

20. A cart conveyor system according to claim 16, wherein (a) said conveyor mechanism has an entry end and an exit end and includes a load size limiting frame at said entry end, (b) said load size limiting frame accommodating the passage of a cart having a load with greater than said cart and extending over said support surfaces.

21. A cart conveyor system according to claim 16, wherein (a) said cart includes conveyor engaging abutment elements at each side, laterally adjacent said first wheels, (b) said abutment elements comprising first and second abutment portions, (c) said first abutment portions being oriented to be substantially perpendicular to the conveyor bands of an upwardly inclined conveyor mechanism and said second abutment portions being oriented to be substantially perpendicular to the conveyor bands of a downwardly inclined conveyor.

22. A cart conveyor system according to claim 17, wherein (a) means are provided for braking at least one of said first or second wheels against rotation when said cart is unattended, and (b) said track means for said braked wheels is formed of a series of free-rotating rollers arranged to form a substantially continuous moving surface to accommodate movement of said braked wheels.

23. A cart conveyor system according to claims 22, wherein (a) said rollers are arranged in at least two side-by-side rows, and (b) the rollers of one row are offset from rollers of an adjacent row in the direction of movement of said braked wheels.

24. A cart conveyor system according to claim 21, wherein (a) rigid support elements extending downward from said cart frame along outer sides of said first wheels, and (b) said abutment elements comprising rigid elements of generally V-shaped configuration defining said first and second abutment portions.

* * * * *